United States Patent
Qiao et al.

(10) Patent No.: US 7,712,357 B2
(45) Date of Patent: May 11, 2010

(54) METHOD AND SYSTEM FOR ROUGH ROAD INDICATIONS FOR MISFIRE DETECTION

(75) Inventors: Ningsheng Qiao, Troy, MI (US); Jeff Naber, Houghton, MI (US); Marvin Lynch, Detroit, MI (US); Karen Skalny, Shelby Township, MI (US); Alan Chewter, Ypsilanti, MI (US)

(73) Assignee: Continental Automotive Systems, Inc., Deer Park, IL (US)

( * ) Notice: Subject to any disclaimer, the term of this patent is extended or adjusted under 35 U.S.C. 154(b) by 50 days.

(21) Appl. No.: 11/696,584

(22) Filed: Apr. 4, 2007

(65) Prior Publication Data

US 2008/0249811 A1  Oct. 9, 2008

(51) Int. Cl.
*G01M 15/11* (2006.01)
(52) U.S. Cl. .................. 73/114.12; 73/114.05
(58) Field of Classification Search ............. 73/114.02, 73/114.03, 114.04, 114.05, 114.11, 114.12
See application file for complete search history.

(56) References Cited

U.S. PATENT DOCUMENTS

| 5,345,817 | A | * | 9/1994 | Grenn et al. | 73/114.04 |
| 5,509,302 | A | * | 4/1996 | Drexel et al. | 73/114.05 |
| 5,515,720 | A | * | 5/1996 | Remboski et al. | 73/114.05 |
| 5,544,521 | A | * | 8/1996 | McCombie | 73/114.04 |
| 5,808,186 | A | * | 9/1998 | Matsumoto et al. | 73/114.03 |
| 5,870,688 | A | * | 2/1999 | Kanbara et al. | 701/110 |
| 7,325,446 | B1 | * | 2/2008 | Assaf et al. | 73/114.12 |
| 2008/0011069 | A1 | * | 1/2008 | Assaf et al. | 73/117.3 |

* cited by examiner

*Primary Examiner*—Eric S McCall

(57) ABSTRACT

A method of operating an engine includes determining at least one characteristic of rough road performance based on at least one driveline characteristic and receiving crankshaft acceleration data. The method further includes comparing the received crankshaft acceleration data and determined characteristic, inhibiting the misfire counter based on the comparison, and operating the engine based on the disabled misfire detection.

18 Claims, 3 Drawing Sheets

100

200

300

METHOD AND SYSTEM FOR ROUGH ROAD INDICATIONS FOR MISFIRE DETECTION

TECHNICAL FIELD OF THE INVENTION

The present invention relates generally to engines and in particular to detection of engine misfires.

BACKGROUND OF THE INVENTION

Engine misfires occur in internal combustion engines when the fuel fails to entirely combust. Misfires are undesirable because misfires reduce fuel efficiency and engine power output. In addition, misfires can also contribute to emission levels, as uncombusted fuel released to the atmosphere contains higher levels of particulate matter and Volatile Organic Compounds ("VOC") than combusted fuel. As a result, regulatory agencies may seek to reduce emissions by controlling engines to reduce misfires.

Methods for detecting misfires are known, but false positives can result in undesired effects, such as reduced accuracy for detecting true positives and increased warranty expenses. These problems are aggravated by operating engines in environments known to create torsional vibrations that can deceptively appear to result from misfires. For example, vehicle operation in a 'rough road' environment can produce the apparently random torsional vibrations in a driveline that many misfire detection algorithms analyze. Furthermore, these rough road torsional vibrations of the driveline are characteristically low frequency, and therefore further mimic misfire effects on the driveline, further confounding many misfire detection algorithms.

False positive detection of misfire events can result in unnecessary warranty repair services as the false positive is recorded in an onboard log, and can illuminate a "check engine" light. Each of these outcomes can result in unnecessary services since the trigger (i.e. the misfire) did not occur.

Therefore, it would be desirable to provide a method and system of operating an engine that would overcome the aforementioned and other disadvantages.

SUMMARY OF THE INVENTION

One aspect of the invention provides a method of operating an engine that includes determining at least one characteristic of rough road performance based on at least one driveline characteristic and receiving crankshaft acceleration data. The method further includes comparing the received crankshaft acceleration data and determined characteristic, inhibiting the misfire counter based on the comparison, and operating the engine based on the disabled misfire detection.

Another aspect of the invention provides a computer readable medium including computer readable code for operating an engine that includes computer readable code for determining at least one characteristic of rough road performance based on at least one driveline characteristic and computer readable code for receiving crankshaft acceleration data. The medium further includes computer readable code for comparing the received crankshaft acceleration data and determined characteristic, computer readable code for inhibiting the misfire counter based on the comparison, and computer readable code for operating the engine based on the disabled misfire detection.

Yet another aspect of the invention provides a system for operating an engine that includes means for determining at least one characteristic of rough road performance based on at least one driveline characteristic and means for receiving crankshaft acceleration data. The system further includes means for comparing the received crankshaft acceleration data and determined characteristic, means for inhibiting the misfire counter based on the comparison, and means for operating the engine based on the disabled misfire detection.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

DETAILED DESCRIPTION OF THE PRESENTLY PREFERRED EMBODIMENTS

Figure 1:
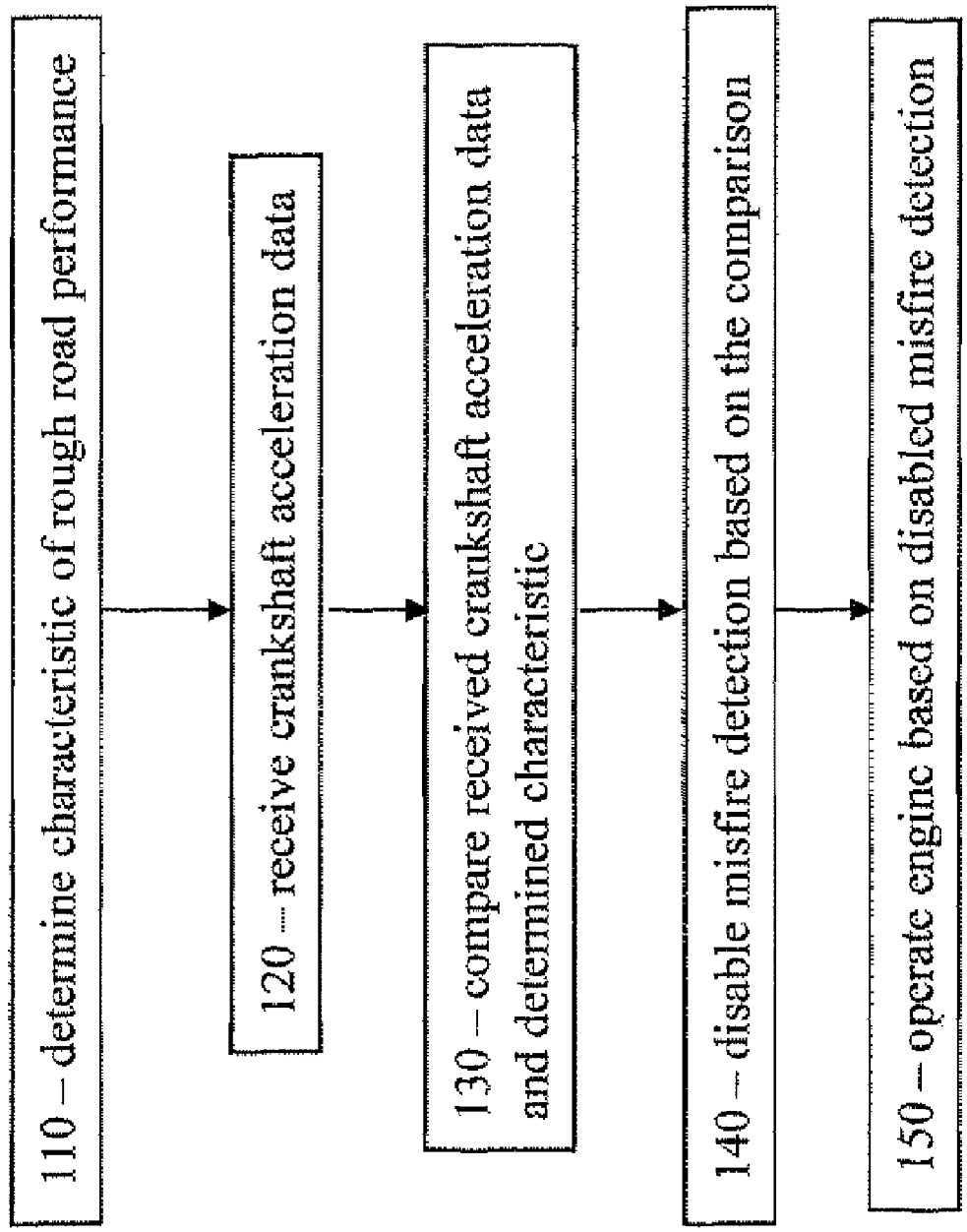
FIG. 1 illustrates one embodiment of a method for operating an engine, in accordance with one aspect of the invention.

FIG. 1 illustrates one embodiment of a method 100 for operating an engine, in accordance with one aspect of the invention. At least one characteristic of rough road performance is determined at step 110. The characteristic is determined by sampling data from at least one driveline characteristic. For example, the torsional vibration of the driveline is sampled in one embodiment. In another embodiment, crankshaft acceleration is sampled. In yet other embodiments, crankshaft rotation is sampled.

The characteristics are determined on a model basis, in one embodiment. For example, sample vehicles that are similarly equipped are operated in a known rough road environment, and the rough road characteristic is received based on the engine operation in the known rough road environment. In such embodiments, the received rough road characteristic is used to determine a threshold value. The number of sampled vehicles can vary depending on budget, statistical variance, or other considerations, but in one example, 10 vehicles are used. Other techniques for establishing parameters or thresholds for determining the existence of a rough road environment are known, and may be used within the teachings of these disclosures.

After the characteristic is determined, an engine is operated to drive a crankshaft, and crankshaft acceleration data is received at a processor at step 120. In one embodiment, the processor is a portion of an engine controller. The crankshaft acceleration data is information determined from operation of an engine other than a sample engine.

In one embodiment, the crankshaft acceleration data is filtered prior to further processing. Filtering the data signal can improve system performance by reducing inaccuracy introduced by outlier signals and, depending on implementation, by focusing data processing on certain portions, such as high or low frequency and/or amplitude signals. In one embodiment, the filter is a low pass filter. In other embodiments, the filter is a high pass filter. These filters can be implemented using digital filter designs known in common practice.

The determined characteristic and the received crankshaft acceleration data are compared at step 130, and misfire detection for the engine is disabled based on the comparison at step 140. In one embodiment, the engine controller executes a misfire detection algorithm during general operation. The engine is then operated based on the disabled misfire detection at step 150. In one embodiment, the engine operates based on the disabled misfire detection for a predetermined span of time. The predetermined span of time, in one embodiment is responsive to the number of cylinder events. In another embodiment, the engine operates based on the disabled misfire detection based on repeated comparisons of newly received crankshaft acceleration data and the determined characteristic. In yet another embodiment, the engine operated based on the disabled misfire detection for a predetermined number of crankshaft revolutions.

Figures 2, 3:
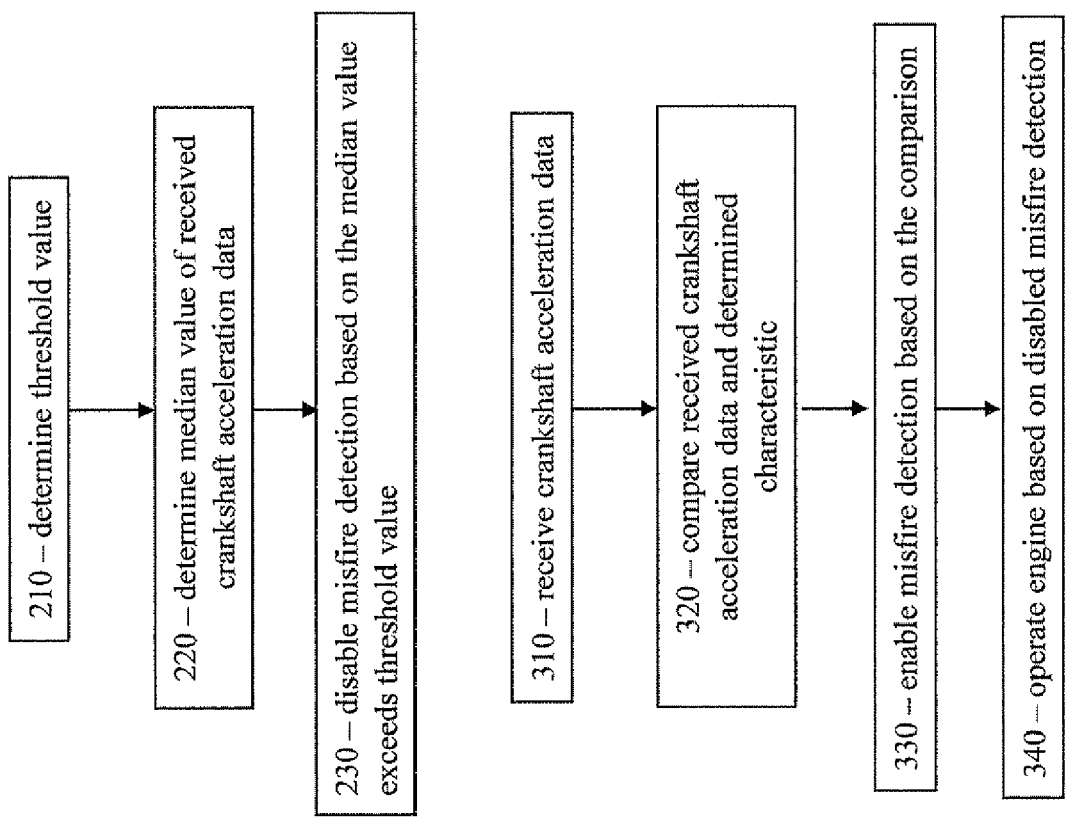
FIG. 2 illustrates one embodiment of a method for operating an engine, in accordance with one aspect of the invention.
FIG. 3 illustrates one embodiment of a method for operating an engine, in accordance with one aspect of the invention.

FIG. 2 illustrates one embodiment of a method 200 for comparing the received crankshaft acceleration data and the determined characteristic, as in step 130, in accordance with one aspect of the invention. Method 200 begins by determining a threshold value at step 210. The threshold value is a value of the determined characteristic indicative of the existence of a rough road condition sufficient to trigger a disabling of the misfire detection. In addition, a time weighted trim mean of the crankshaft acceleration data is determined at step 220, and the time weighted trim mean of crankshaft acceleration data used for the comparisons of step 130. The time weighted trim mean can be determined or estimated. In addition, the time weighted trim mean can be calculated using any appropriate technique. As in step 140, the misfire detection is disabled when the time weighted trim mean of the crankshaft acceleration data exceeds the threshold value at step 230. In one embodiment, the threshold value is a function of multiple dimensions of engine operating conditions.

FIG. 3 illustrates one embodiment of a method 300 for operating an engine in accordance with one aspect of the invention. Method 300 provides method steps for operating an engine following method step 150 wherein an engine operates with misfire detection disabled. Method 300 begins at step 310 by receiving crankshaft acceleration data based on the engine operation with misfire detection disabled. The misfire detection disabled crankshaft acceleration data is compared to the determined characteristic at step 320. In one embodiment, the time weighted trim mean of a set of crankshaft acceleration data values is determined, and the time weighted trim mean is used in the comparison. Based on the comparison, misfire detection is enabled at step 330, and at step 340, the engine is operated based on the enabled misfire detection.

In one embodiment, the determined characteristic is calibrated during a testing process. The calibration process can be used to control the sensitivity of the algorithm to increase or decrease the level of rough road sufficient to trigger a disabled misfire detection. In one embodiment, the disabling or enabling of the misfire detection is responsive to a set flag. In one embodiment, disabling the misfire detection includes setting the flag based on the determination that the crankshaft acceleration data exceeds the determined characteristic. In another embodiment, enabling the misfire detection includes deleting the set flag.

Figure 4:
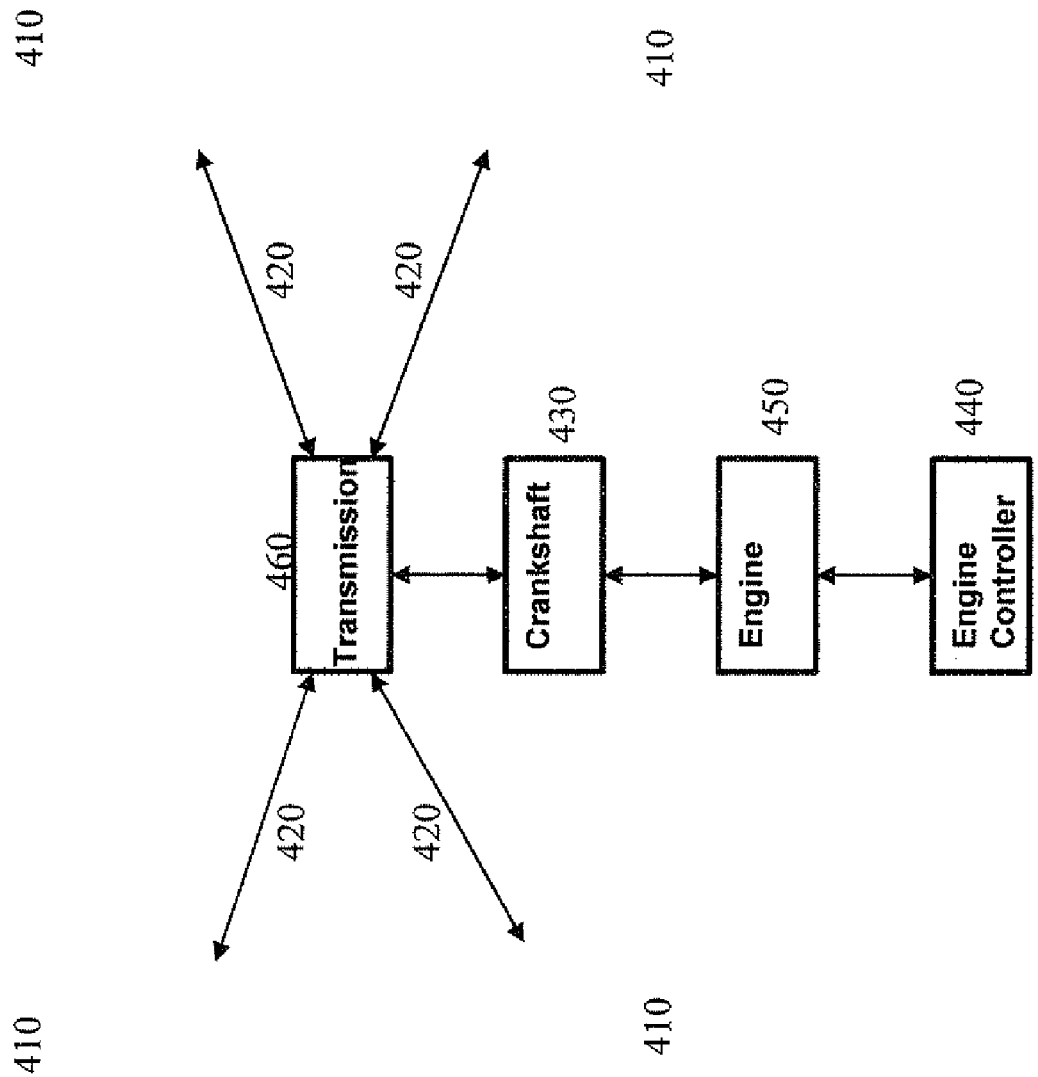
FIG. 4 illustrates one embodiment of a schematic arrangement of an engine driving 4 wheels, in accordance with one aspect of the invention

FIG. 4 illustrates one embodiment of an engine driving wheels in accordance with one aspect of the invention. FIG. 4 illustrates two sets of two wheels 410 connected by first and second axles 420. First and second axles 420 are connected by transmission/flywheel 460 to the crankshaft 430 to an engine 450 and an engine controller 440. Engine 450 provides energy in the form of torque to drive the crankshaft 430, transmission/flywheel 460 and rotate wheels 410. Engine controller 440 controls operation of the engine, and monitors performance of the vehicle.

Using the disclosures contained herein, an engine can operate using misfire detection techniques while under 'normal' road driving environments and disable the misfire detection techniques while the vehicle is operating in a rough road environment, and re-enable the misfire detection when the vehicle is no longer in the rough road environment. Such techniques can reduce false recording of misfire occurrences, such as a recorded misfire on an OnBoard Diagnostic tool (such as the OBD-II) than can result in unnecessary repairs or service calls and warranty claims.

Another aspect of the invention provides a method of reducing warranty claims. The method includes setting a warranty policy for a predetermined time span and covering service costs. The method further includes setting a determined characteristic of rough roads for disabling a misfire detection algorithm and receiving crankshaft acceleration data. The received crankshaft acceleration data is compared to the determined characteristic and if the received crankshaft acceleration data exceeds the determined characteristic, the misfire detection algorithm is disabled so that any misfires detected by the misfire algorithm that result from the rough road condition are not recorded in a diagnostic trouble code ("DTC") log and are not stored in the vehicle or serve as a basis for illumination of the "check engine" light. By reducing false instantiations of misfire detection stored in the DTC log, and reducing illumination of the 'check engine' light, the method reduces warranty claims.

In one embodiment, the term "exceeds" includes both "greater than" as well as "greater than or equal to" while in other embodiments, the term "exceeds" means only "greater than." While the teachings of this disclosure are applicable in any operating environment, it is anticipated that one operating environment is automotive, especially in a transmission or engine controller. It is important to note that the figures and description illustrate specific applications and embodiments of the present invention, and is not intended to limit the scope of the present disclosure or claims to that which is presented therein. Upon reading the specification and reviewing the drawings hereof, it will become immediately obvious to those skilled in the art that myriad other embodiments of the present invention are possible, and that such embodiments are contemplated and fall within the scope of the presently claimed invention.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A method of operating an engine, the method comprising:
   determining a threshold value of at least one characteristic of rough road performance based on at least one driveline characteristic;
   receiving crankshaft acceleration data;
   determining at least one time weighted trim mean of the received crankshaft acceleration data;

comparing the at least one time weighted trim mean of the received crankshaft acceleration data and the determined threshold value of the characteristic;

disabling misfire detection based on the comparison when the determined time weighted trim mean exceeds the threshold value; and operating the engine based on the disabled misfire detection.

2. The method of claim 1 wherein receiving crankshaft acceleration data comprises: routing crankshaft acceleration data through at least a rough road detection path.

3. The method of claim 1 wherein disabling the misfire detection comprises: setting at least one flag responsive to the determination that the determined time weighted trim mean exceeds the threshold value.

4. The method of claim 1 further comprising: receiving crankshaft acceleration data based on the engine operation with misfire detection disabled; comparing the received crankshaft acceleration data and determined characteristic; and enabling misfire detection based on the comparison;

and operating the engine based on the enabled misfire detection.

5. The method of claim 1 wherein determining the threshold value comprises: operating at least one engine in a known rough road environment; receiving at least one rough road characteristic based on the engine operation; and determining the threshold value based on the received rough road characteristics.

6. The method of claim 5 wherein determining the threshold value based on the received rough road characteristics comprises calibrating the threshold value.

7. A computer usable medium storing a computer program including computer program code configured to control engine operation, the medium comprising: computer program code configured to determine a threshold value of at least one characteristic of rough road performance based on at least one driveline characteristic; computer program code configured to receive crankshaft acceleration data; computer program code configured to determine at least one time weighted trim mean of the received crankshaft acceleration data;

computer program code configured to compare the at least one time weighted trim mean of the received crankshaft acceleration data and the determined threshold value of the characteristic; and computer program code configured to disable misfire detection based on the comparison when the determined time weighted trim mean exceeds the threshold value; and computer program code configured to operate the engine based on the disabled misfire detection.

8. The computer usable medium of claim 7 wherein the computer program code configured to receive crankshaft acceleration data comprises: computer program code configured to route crankshaft acceleration data through at least a rough road detection path.

9. The computer usable medium of claim 7 further comprising: computer program code configured to receive crankshaft acceleration data based on the engine operation with misfire detection disabled; computer program code configured to compare the received crankshaft acceleration data and the determined characteristic; and computer program code configured to enable misfire detection based on the comparison; and computer program code configured to operate the engine based on the enabled misfire detection.

10. The computer usable medium of claim 7 wherein the computer program code configured to disable the misfire detection comprises: computer program code configured to set at least one flag responsive to the determination that the determined time weighted trim mean exceeds the threshold value.

11. The computer usable medium of claim 10 wherein the computer program code configured to determine the threshold value comprises: computer program code configured to operate at least one engine in a known rough road environment; computer program code configured to receive at least one rough road characteristic based on the engine operation; and computer program code configured to determine the threshold value based on the received rough road characteristics.

12. The computer usable medium of claim 11 wherein the computer program code configured to determine the threshold value based on the received rough road characteristics comprises computer program code configured to calibrate the threshold value.

13. An engine controller having a processor configured to perform operations comprising: determining a threshold value of at least one characteristic of rough road performance based on at least one driveline characteristic; receiving crankshaft acceleration data;

determining at least one time weighted trim mean of the received crankshaft acceleration data; comparing the at least one time weighted trim mean of the received crankshaft acceleration data and the determined threshold value of the characteristic;

disabling misfire detection based on the comparison when the determined time weighted trim mean exceeds the threshold value; and operating the engine based on the disabled misfire detection.

14. The engine controller of claim 13 wherein receiving crankshaft acceleration data comprises: routing crankshaft acceleration data through at least a rough road detection path.

15. The engine controller of claim 13 wherein disabling the misfire detection comprises: setting at least one flag responsive to the determination that the determined time weighted trim mean exceeds the threshold value.

16. The engine controller of claim 13 wherein the processor is configured to perform further operations comprising:

receiving crankshaft acceleration data based on the engine operation with misfire detection disabled; comparing the received crankshaft acceleration data and determined characteristic; and enabling misfire detection based on the comparison; and operating the engine based on the enabled misfire detection.

17. The engine controller of claim 13 wherein determining the threshold value comprises: operating at least one engine in a known rough road environment; receiving at least one rough road characteristic based on the engine operation; and determining the threshold value based on the received rough road characteristics.

18. The engine controller of claim 17 wherein determining the threshold value based on the received rough road characteristics comprises calibrating the threshold value.

* * * * *